US010068036B2

(12) United States Patent
Lee et al.

(10) Patent No.: US 10,068,036 B2
(45) Date of Patent: Sep. 4, 2018

(54) SIMULATION OF RESIZABLE BODIES USING A RIGID BODY SOLVER

(71) Applicant: Dassault Systemes SolidWorks Corporation, Waltham, MA (US)

(72) Inventors: Kyeong Hwi Lee, Lexington, MA (US); Shrikant Vitthal Savant, Shrewsbury, MA (US)

(73) Assignee: Dassault Systemes Solidworks Corporation, Waltham, MA (US)

( * ) Notice: Subject to any disclaimer, the term of this patent is extended or adjusted under 35 U.S.C. 154(b) by 311 days.

(21) Appl. No.: 14/977,902

(22) Filed: Dec. 22, 2015

(65) Prior Publication Data

US 2016/0179988 A1      Jun. 23, 2016

Related U.S. Application Data

(60) Provisional application No. 62/096,285, filed on Dec. 23, 2014.

(51) Int. Cl.
   *G06F 17/50*      (2006.01)
(52) U.S. Cl.
   CPC .......... *G06F 17/50* (2013.01); *G06F 17/5009* (2013.01); *G06F 17/5086* (2013.01); *G06F 2217/06* (2013.01)
(58) Field of Classification Search
   CPC .. G06F 17/50; G06F 17/5009; G06F 17/5086; G06F 2217/06
   See application file for complete search history.

(56) References Cited

U.S. PATENT DOCUMENTS

| 9,664,508 | B2 * | 5/2017 | McAfee | G01B 11/24 |
| 2005/0093860 | A1 * | 5/2005 | Yanagisawa | G06T 19/00 345/419 |
| 2009/0187385 | A1 * | 7/2009 | Zegdoun | G06F 17/50 703/1 |
| 2015/0178414 | A1 * | 6/2015 | Gibson | G06F 17/5086 703/1 |

FOREIGN PATENT DOCUMENTS

WO   WO 2016/106249 A1   6/2016

OTHER PUBLICATIONS

Notification Concerning Transmittal of International Preliminary Report on Patentability for Int'l Application No. PCT/US2015/067205, titled: Simulation of Resizable Bodies Using a Rigid Body Solver, dated Jul. 6, 2017.

(Continued)

*Primary Examiner* — Pho M Luu
(74) *Attorney, Agent, or Firm* — Hamilton, Brook, Smith & Reynolds, P.C.

(57) ABSTRACT

A computer-implemented method and system automatically adjusts the size of a rigid body model. The method and system construct a two-dimensional model or a three-dimensional model, where the model has one or more rigid bodies. The rigid bodies are converted into geometric primitives that represent a respective rigid body and enable the respective rigid body to resize. One or more of the primitives are constrained to one another. A solver process changes a size of at least one geometric primitive and a rigid body simulation process uses the resized primitive(s) as input.

20 Claims, 5 Drawing Sheets (56) References Cited

OTHER PUBLICATIONS

International Search Report and Written Opinion for Int'l Application No. PCT/US2015/067205, titled: Simulation of Resizable Bodies Using a Rigid Body Solver, dated Apr. 22, 2016.
Chang, K.-H., "Motion Simulation and Mechanism Design with SolidWorks Motion 2011," Retrieved from the Internet: http://www.sdcpublications.com/pdfsample/978-1-58503-669-1-1.pdf, Retrieved on: Mar. 9, 2015, 19 pages.
Hsu, C. et al.,"A Constraint-based Manipulator Toolset for Editing 3D Objects," Proceedings of the Symposium on Solid Modeling and Applications, New York, ACM, US, vol. Symp. 4, pp. 168-180 (May 14, 1997).
Sohrt, W. & Brüderlin, B.D., "Interaction With Constraints in 3D Modeling," SMA '91 Proceedings of the First ACM Symposium on Solid Modeling Foundations and CAD/CAM Applications, ACM, 2 Penn Plaza, Suite 701, New York, USA, pp. 387-396 (Jun. 5, 1991).
Sutherland, I.E., "Sketchpad: A Man-Machine Graphical Communication System," Proceedings of the Spring Joint Computer Conference, Detroit, USA, pp. 329-346 (May 1963).

\* cited by examiner

| SHAPE | REPRESENTATION |
|---|---|
| 305  | 310  |
| 315  | 320  |
| 325  | 330  |
| 335  | 340  |
| 345  | 350  |
| 355  | 360  |

SIMULATION OF RESIZABLE BODIES USING A RIGID BODY SOLVER

RELATED APPLICATION

This application claims the benefit of U.S. Provisional Application No. 62/096,285, filed on Dec. 23, 2014. The entire teachings of the above application are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to respective topological faces bounded by edges. Hereinafter, the terms vertex, edge, and face will be used interchangeably with their respective, corresponding geometric entities.

A design engineer is a typical user of a 3D CAD system. The design engineer designs physical and aesthetic aspects of 3D models, and is skilled in 3D modeling techniques. The design engineer creates parts and may assemble the parts into a subassembly or an assembly. A subassembly may also consist of other subassemblies. An assembly is designed using parts and subassemblies. Parts and subassemblies are hereinafter collectively referred to as components.

During the design process, an engineer may wish to analyze the motion of a 3D design of a model to evaluate the real-world requirements and performance of the product being designed. Such an analysis may be executed by an engineering simulation process, such as SOLIDWORKS® Motion and SOLIDWORKS® Simulation, both available from Dassault Systemes SolidWorks Corporation of Waltham, Mass., and both of which use the CAD model data to set up and execute motion and simulation studies.

Motion analysis is one of the most important and basic analyses that is executed during the design of a real-world object. While motion analysis is very useful for providing insightful numerical results, there is a very stringent assumption made by analysis programs about the rigidity of parts in the assembly. Usually, motion analysis of a mechanism is done under the assumption that the parts in the assembly are rigid (i.e., the parts do not change size or shape).

However, when motion analysis is repeatedly performed, for example within another analysis process, often a need exists to resize the geometry of the parts involved in the motion analysis. For example, when a user wants to optimize the design of a mechanism to reduce a tracking error (i.e., the difference between the desired trajectory and the actual trajectory traced by the tracking point of a mechanism), rigid body simulation needs to be performed repeatedly such that in every iteration of the optimizer the rigid parts are resized to different dimensions and the tracking error is computed once again. Using conventional rigid body models becomes difficult in such a case because the dimensions of the parts keep changing. Generally, a user's only option is to discard previously built rigid body models and build new ones in every iteration cycle of the simulation process, where the new rigid body models have resized dimensions of individual parts. This is inefficient and time consuming.

A method and system that does not require a user to redesign one or more parts multiple times in order to run a motion analysis process in which rigid parts need to be resized would enhance the capabilities of CAD and computer-aided simulation systems by speeding up the process in which a model may be designed and analyzed.

SUMMARY OF THE INVENTION

In general, in one aspect, embodiments of the invention feature a computer-implemented method for automatically adjusting the size of a rigid body. The computer-implemented method constructs a two-dimensional or a three-dimensional model, where the model is comprised of one or more rigid bodies. At least one of the rigid bodies is represented by primitive entities that are constrained to one another in such a way as to allow for automatic resizing of the rigid body represented as the primitive entities.

Other embodiments include a computer-aided design (CAD) system having a processor operatively coupled to a data storage system and a data storage memory operatively coupled to the processor. In such embodiments, the data storage system stores a two-dimensional (2D) and/or three-dimensional (3D) model, the 2D and/or 3D model represents a real-world object and comprises a rigid body, and the data storage memory comprises instructions to configure the processor to automatically adjust a size of the rigid body.

Still other embodiments include a computer-readable medium configured to store instructions for creating a 2D and/or a 3D model where the model represents a real-world object and comprises a rigid body. The instructions, when loaded and executed by a processor, cause the processor to automatically adjust a size of the rigid body.

Embodiments execute a solver process, which changes the size of one of the primitives. Additionally, a rigid body simulation is executed in which the resized primitives are used as inputs to the rigid body simulation. Embodiments may include using the output of the rigid body simulation as input to a second iteration of the execution of the solver process.

Further embodiments include each of the geometric primitives defining a resizable shape, and the constraints (a) constraining a subset of the members to be parallel to one another, (b) constraining a subset of the members to be perpendicular to one another, or (c) maintaining a prescribed angle between certain of the members. The primitives include at least one of a point, a line, a circle, a planar polygon, a cylinder, a three-dimensional prism, and a parameterizable surface. Moreover, the primitives may be a line having endpoints that may change location, a rectangle having adjacent sides constrained by perpendicular constraints, a triangle having sides constrained by specified angles, a plane, a set of six planes, two perpendicular lines representing a cylinder, or any combination thereof. Parameter values may be selected for the resized primitives output by the solver process to reflect a desired design of the model, where the parameter values are design constraints.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

DETAILED DESCRIPTION OF THE INVENTION

Simulating rigid body motion of an assembly of parts designed using a computer-aided design (CAD) system often requires rigid body parts to resize, as is the case during optimization or design of experiments (DOE) methods. In state-of-the-art systems, usually the only option is to discard previously designed rigid body models and rebuild a new model with different dimensions before executing a simulation of the rigid body motion again. The present invention addresses this problem by enabling the reuse of rigid body models even after resizing the parts in the models.

In general, the present invention enables the simulation of resizable bodies without having to rebuild a new rigid body model in every iteration cycle. Utilizing the present invention is far more efficient than having to discard previously designed models and create new models to resize one or more rigid parts after an iteration cycle. The present invention may be used as the foundation to solve various optimization problems including, by way of non-limiting example, tracking problems, and problems related to motor acceleration and motor torques.

Figure 1:
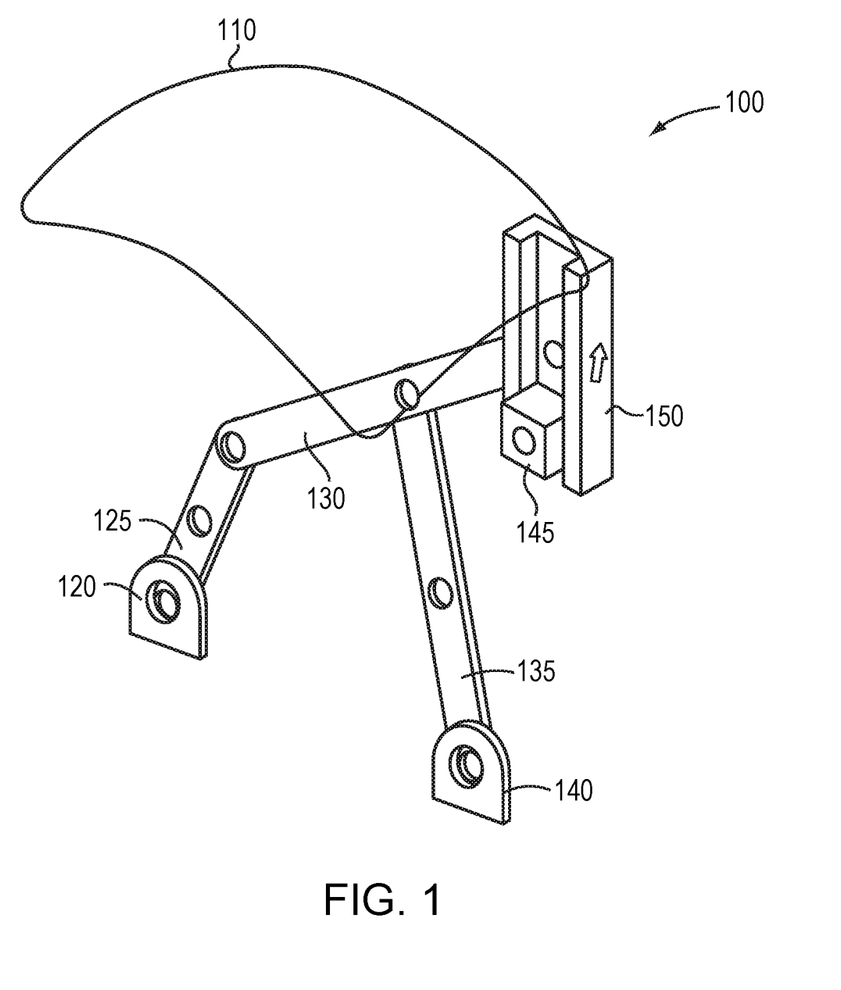
FIG. 1 is an illustration of a computer-aided design (CAD) model.

Referring now to FIG. 1, an illustration of a CAD model 100 is shown. The model 100 contains parts 120-150, which are constrained to at least one other part. Parts 120 and 140 are also constrained to the ground, which is beneath parts 120 and 140. A path 110 along which part 150 moves is also shown in FIG. 1. Path 110 may reflect a path output by a simulation process. Alternatively, path 110 may have been input by a user and the sizes of parts 120-150 may have been resized automatically by the present invention so that part 150 travels along the path as model 100 undergoes a motion analysis process.

Figure 2:
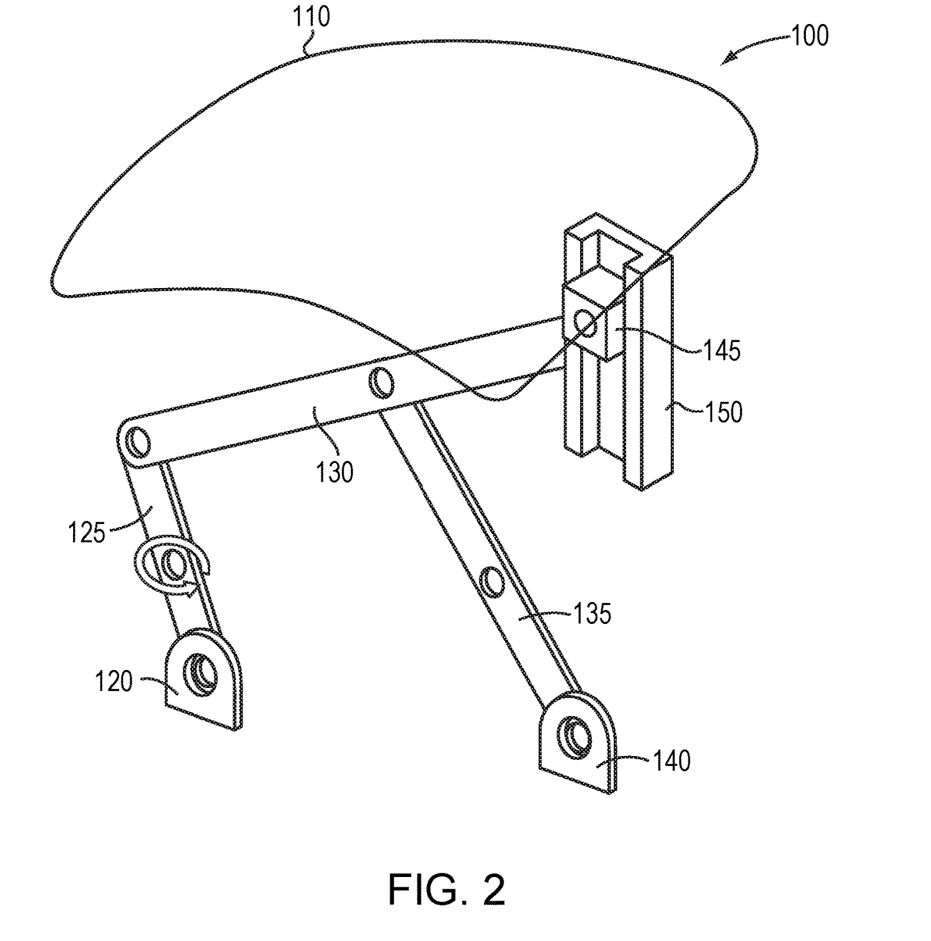
FIG. 2 is an illustration of the computer-aided design (CAD) model in FIG. 1 after motion to one or more parts has occurred.

FIG. 2 is an illustration of CAD model 100 after parts 120-150 have undergone motion in an embodiment of the present invention. As shown in FIG. 2, part 150 is at a different location on the path 110. Additionally, the orientations of parts 125 and 135 are at different angles with respect to part 130 than as shown in FIG. 1 due to motion of model 100. The orientations of parts 125 and 135 are also at different angles to parts 120 and 140, respectively, due to motion of model 100.

The present invention allows rigid bodies to resize without a user having to rebuild one or more rigid body models of the entire mechanism. Each rigid body model is converted to a representation that is a collection of geometric primitives such as points, lines, planes, and parameterizable surfaces (i.e., any surface that can be defined using some parameters that may be held fixed during the rigid body simulation to make the surface rigid). Each of these geometric primitives, in turn, represents rigidly in the model. Any original dimension that was internal to the CAD part model is converted to an external dimension between the collection of geometric primitives.

Appropriate constraints are applied to the geometric primitives based on the geometry type. For example, for a rectangle the lines representing the boundary of the rectangle are constrained geometrically so that adjacent lines remain perpendicular to each other. Data specifying an original size is converted to a dimension constraint in the rigid body representation (i.e., the collection of geometric primitives representing the rigid body). Thus, the height of the rectangle becomes one dimension constraint and the width of the rectangle becomes a second dimension constraint in the rigid body representation, thereby ensuring that the height of the left and right sides of the rectangle and the widths of the top and bottom of the rectangle maintain the same value. All the geometries in the representation are allowed to move with respect to each other provided that the geometries satisfy the geometric constraints and the dimension constraints.

Figure 3:
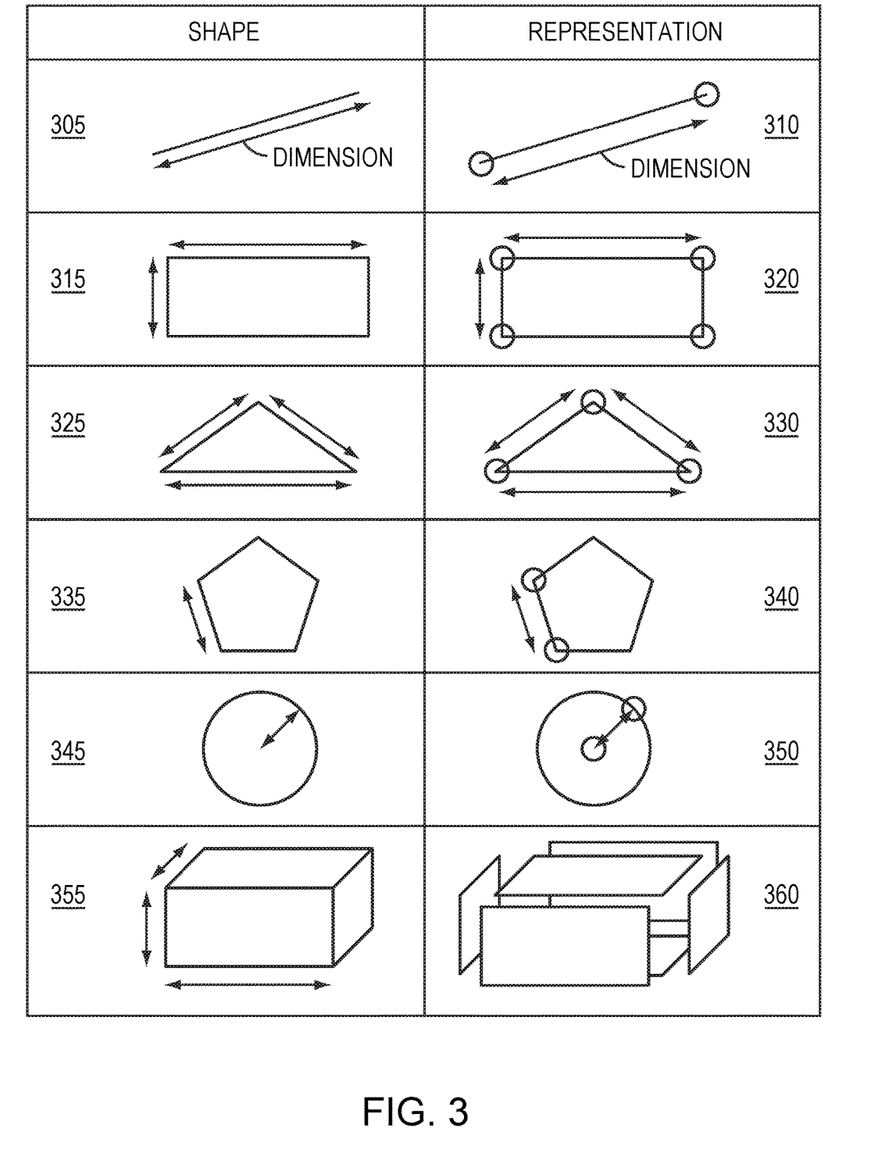
FIG. 3 is a table showing shapes and respective primitive representations.

Referring now to FIG. 3, examples of the conversion of rigid bodies into basic flexible primitives is shown. The left column illustrates rigid body shapes, which are a line 305, a rectangle 315, a triangle 325, a regular polygon 335, a circle 345, and a three-dimensional (3D) box 355. The right column illustrates corresponding rigid body representations 310, 320, 330, 340, 350, 360 (which are collections of geometric primitives) of the line 305, the rectangle 315, the triangle 325, the regular polygon 335, the circle 345, and the 3D box 355, respectively. Such rigid body representations 310, 320, 330, 340, 350, 360 allow the shapes 305, 315, 325, 335, 345, and 355 in the left column of FIG. 3 to be resizable without user intervention. As illustrated, the line 305 is converted into a line representation 310, which is a line primitive having a dimension constraint (illustrated by an arrow) between the endpoints; the endpoints are illustrated by circles. The rectangle 315 is converted into a rectangular representation 320, which consists of four line primitives having dimension constraints (illustrated by arrows) between the appropriate endpoints (illustrated by circles). In addition, the line primitives are constrained such that the adjacent lines are perpendicular to each other. The triangle 325 is converted into a triangle representation 330 having three lines constrained to adjacent lines at the appropriate endpoints of the three lines (illustrated by circles). Other constraints may constrain adjacent lines such that adjacent lines meet at right angles and have coincident endpoints. Additionally, constraints may specify minimum and/or maximum values for the angles between adjacent lines. The regular polygon 335 is converted into a polygon representation 340 having adjacent lines constrained at the appropriate endpoints and a fixed angle between them. The circle 345 is converted into a circle representation 350 with center location defined by the inner point and the radius defining the distance between the center point and the point on the circumference with the additional constraint that the point on the circumference lies on the periphery. The 3D box 355 is converted into a representation 360 having dimension constraints between opposite planes that are also constrained to be parallel to each other with the additional constraints that appropriate planes are orthogonal to each other. Moreover, as discussed, the heights and widths of rigid bodies may be constrained in respective representations of those rigid bodies.

Another flexible primitive may consist of six planes that represent a rectangular prism, which allows the vertices and therefore the dimensions of the six planes to be adjusted by an optimization process. Furthermore, another flexible primitive may be two perpendicular lines that represent a height and a radius of a cylindrical body.

If the original rigid body part changes size for example, as a result of an optimizer process, the corresponding dimension in the representation is changed and is added as a constraint possibly replacing the previous constraint corresponding to the same dimension having a different value. This allows the parts to resize and still maintain their rigid nature with the presence of proper constraints and dimensions.

This present invention may operate in a two-dimensional and a three-dimensional environment. The geometric shape may be defined by geometry primitives and a few key dimensions. Additional shapes beyond those which are shown in FIG. 3, such as any irregular shape, may have corresponding rigid body representations as well. For example, in a two-dimensional environment, the shapes that can be built with point, line, and plane primitives are links, rectangles, triangles, and polygons. In three-dimensional space, possible 3D shapes are solid links, rectangular prisms, triangular prisms, and prisms with a polygonal cross section.

Figure 4:
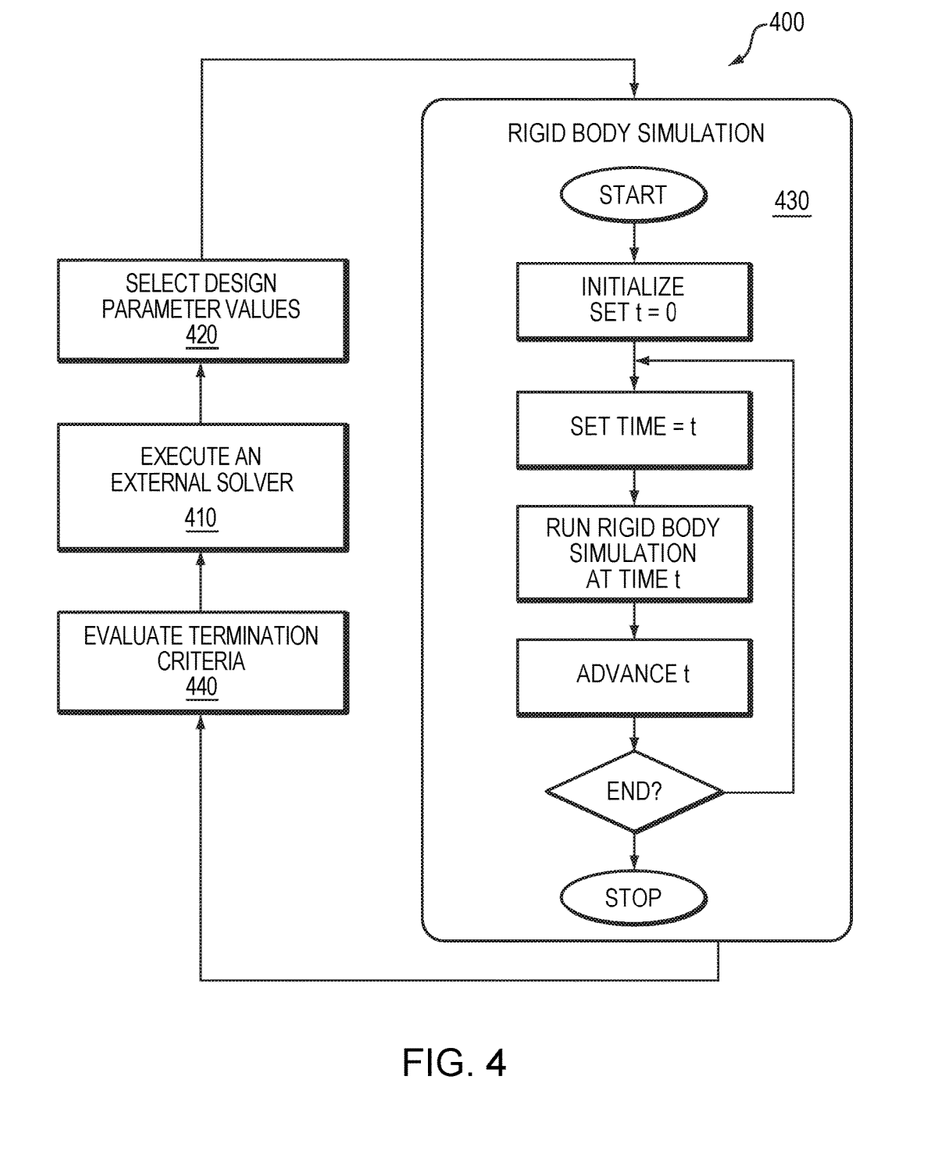
FIG. 4 is a flow diagram of a process that includes a rigid body simulation.

Referring now to FIG. 4, a process 400 that executes a procedure that combines an external solver process and a rigid body simulation is shown. In the first step, an external solver is executed (step 410). The external solver may be an optimizer process or a design of experiments process. An example of an external solver is iSight, available from Dassault Systèmes' Simulia Corp. A 2D or a 3D model is used as input to the external solver. The external solver outputs a different geometric configuration of the respective 2D or 3D model. Parameter values of the mechanism design are then selected (step 420). Such parameter values may be the length and height of a rectangular rigid body, the length of a line, and the base height of a triangular rigid body. A rigid body simulation is then executed (step 430). The output of the rigid body simulation reflects the given set of design parameters, which were held fixed during the rigid body simulation. In the next step, termination criteria are evaluated (step 440). Such criteria may be the number of times to run the rigid body simulation, whether convergence was achieved, the design goals, or any combination thereof. If the termination criteria have not been met, process 400 repeats beginning with executing the external solver (step 410). During process 400, the rigid bodies are allowed to resize because they are represented as a collection of geometric primitives, as has been discussed.

Figure 5:
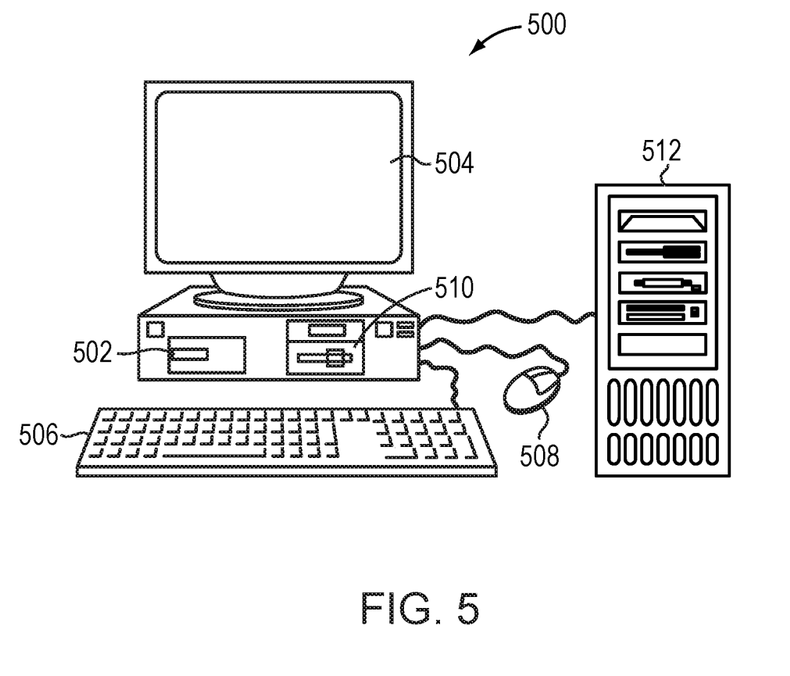
FIG. 5 is an illustration of a computer system in which embodiments of the present invention may be implemented.

FIG. 5 illustrates a computerized modeling system 500 that includes a CPU 502, a computer monitor 504, a keyboard input device 506, a mouse input device 508, and a storage device 510. The CPU 502, computer monitor 504, keyboard 506, mouse 508, and storage device 510 can include commonly available computer hardware devices. For example, the CPU 502 can include an Intel-based processor. The mouse 508 may have conventional left and right buttons that the design engineer may press to issue a command to a software program being executed by the CPU 502. As an alternative or in addition to the mouse 508, the computerized modeling system 500 can include a pointing device such as a mouse, stylus, touch-sensitive pad, or pointing device and buttons built into the keyboard 506. Those of ordinary skill in the art appreciate that the same results described herein with reference to a mouse device can be achieved using another available pointing device. Other appropriate computer hardware platforms are suitable as will become apparent from the discussion herein. Such computer hardware platforms are preferably capable of operating the Microsoft Windows® 7, UNIX, Linux, or MAC OS operating systems.

Additional computer processing units and hardware devices (e.g., rapid prototyping, video, and printer devices) may be included in the computerized modeling system 500. Furthermore, the computerized modeling system 500 may include network hardware and software thereby enabling communication to a hardware platform 512, and facilitating communication between numerous computer systems that include a CPU and a storage system, among other computer components.

Computer-aided modeling and simulation software (e.g., process 400) may be stored on the storage device 510 and loaded into and executed by the CPU 502. The modeling software allows a design engineer to create and modify a 3D model and implements aspects of the invention described herein. The CPU 502 uses the computer monitor 504 to display a 3D model and other aspects thereof as described. Using the keyboard 506 and the mouse 508, the design engineer can enter and modify data associated with the 3D model. The CPU 502 accepts and processes input from the keyboard 506 and mouse 508. The CPU 502 processes the input along with the data associated with the 3D model and makes corresponding and appropriate changes to that which is displayed on the computer monitor 504 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Embodiments of the present invention or aspects thereof described herein may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any of known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

Advantages of the present invention includes resizing rigid body models without user intervention, the reuse of rigid body models even after parts of those models are resized, providing an efficient way to perform repetitive rigid body simulations of an assembly where the parts of the assembly may have different sizes from one iteration to the next, providing an efficient way to perform what-if analyses, and enabling tight integration of analysis in the computer-aided design workflow. The present invention may be utilized even if the design is not fully defined with only a few of the design parameters changing at a time, and thus, is useful at all stages of progressively building an assembly of parts.

Other advantages of the present invention include the following. When the size of the part changes, the primitives in the representation can be changed from an original size to a new size in smaller increments. Changing dimensions in small increments avoids any flipping issues with the geometries involved (e.g., the constraint solver converging to the undesirable solution of two solutions that both satisfy all the equations) incremental change of size keeps the new design closer to the original design without causing any flipping. The solver gives consistent results as the new sizes are applied incrementally. Moreover, without this technology—if a dimension is internal and if the dimension changes then that part must be rebuilt. With this technology, the part can be resized without having to rebuild the part.

While this invention has been particularly shown and described with references to example embodiments thereof, nevertheless, understood by those skilled in the art is that various modifications may be made within the boundaries of the invention. For example, embodiments of the present invention may change the order in which operations are performed. Furthermore, in most contexts, an assembly may also mean a subassembly. Additionally, depending on the needs of an implementation, particular operations described herein may be implemented as a combined operation, eliminated, added to, or otherwise rearranged.

What is claimed is:

1. A computer-implemented method for automatically resizing a rigid body model, the method comprising:
    using a computer-aided design system, constructing a model, wherein:
    the model is one of a two-dimensional model and a three-dimensional model; and
    the model comprises one or more rigid bodies;
        converting at least one of the rigid bodies into a set of geometric primitives representing a respective rigid body, wherein the geometric primitives enable the respective rigid body to resize;
        constraining members of the set of geometric primitives;
        executing a solver process on a computer processor, wherein:
            the solver process changes a size of at least one geometric primitive representing the respective rigid body, the change in the size of the at least one geometric primitive represents resizing of the respective rigid body; and
        the set of geometric primitives representing the respective rigid body allow the change in the size without user intervention; and
        executing a rigid body simulation, wherein the at least one resized geometric primitive is input to the rigid body simulation.

2. The computer-implemented method of claim 1, wherein each of the geometric primitives serve to define a resizable shape.

3. The computer-implemented method of claim 1, further comprising using output of the executed rigid body simulation as input to a second iteration of executing the solver process.

4. The computer-implemented method of claim 1, wherein constraining members of the set of geometric primitives comprises adding constraints that accomplish at least one of: constraining a subset of the members to be parallel to one another, constraining a subset of the members to be perpendicular to one another, and maintaining a prescribed angle between certain of the members.

5. The computer-implemented method of claim 1, wherein each member in the set of geometric primitives is one of a point, a line, a plane, a circle, a planar polygon, a cylinder, a three-dimensional prism, and a parameterizable surface.

6. The computer-implemented method of claim 1, wherein the set of geometric primitives comprises at least one of a line having endpoints that may change location, a rectangle having adjacent sides constrained by perpendicular constraints, a triangle having sides constrained by specified angles, a plane, a set of six planes, two perpendicular lines representing a cylinder, and a parameterizable surface.

7. The computer-implemented method of claim 1, further comprising selecting parameter values for the at least one resized geometric primitive output by the solver process, wherein:
the parameter values reflect a desired design of the model, and
the parameter values are design constraints.

8. A computer-aided design system comprising:
a processor operatively coupled to a data storage system, the data storage system storing a model of a real-world object; and
a data storage memory operatively coupled to the processor and comprising instructions to configure the processor to:
construct the model, wherein the model is one of two-dimensional model and a three-dimensional model comprised of one or more rigid bodies;
convert at least one of the rigid bodies into a set of geometric primitives representing a respective rigid body, wherein the geometric primitives enable the respective rigid body to resize;
constrain one or more members of the set of geometric primitives;
execute a solver process on a computer processor, wherein:
the solver process changes a size of at least one geometric primitive representing the rigid body, the change in the size of the at least one geometric primitive represents resizing of the respective rigid body; and
the set of geometric primitives representing the rigid body allow the change in the size without user intervention; and
execute a rigid body simulation, wherein the at least one resized geometric primitive is input to the rigid body simulation.

9. The computer-aided design system of claim 8, further comprising instructions to configure the processor to select parameter values for the at least one resized geometric primitive output by the solver process, wherein:
the parameter values reflect a desired design of the model, and
the parameter values are design constraints.

10. The computer-aided design system of claim 9, wherein each of the geometric primitives define a resizable shape.

11. The computer-aided design system of claim 8, further comprising instructions to configure the processor to use an output of the executed rigid body simulation as input to a second iteration of executing the solver process.

12. The computer-aided design system of claim 9, wherein the instructions to configure the processor to constrain one or more members of the set of geometric primitives comprises adding constraints that accomplish at least one of: constraining a subset of the members to be parallel to one another, constraining a subset of the members to be perpendicular to one another, and maintaining a prescribed angle between certain of the members.

13. The computer-aided design system of claim 9, wherein each member in the set of geometric primitives is one of a point, a line, a plane, a circle, a planar polygon, a cylinder, a three-dimensional prism, and a parameterizable surface.

14. The computer-aided design system of claim 9, wherein the set of geometric primitives comprises at least one of a line having endpoints that may change location, a rectangle having adjacent sides constrained by perpendicular constraints, a triangle having sides constrained by specified angles, a plane, a set of six planes, two perpendicular lines representing a cylinder, and a parameterizable surface.

15. A non-transitory computer-readable data storage medium comprising instructions causing a computer to:
store a model of a real-world object, wherein the model is one of a two-dimensional model and a three-dimensional model comprised of one or more rigid bodies;
convert at least one of the rigid bodies into a set of geometric primitives representing a respective rigid body, wherein:
each geometric primitive defines a resizable shape, and
the geometric primitives enable the respective rigid body to change a size;
constrain one or more members of the set of geometric primitives;
execute a solver process on a computer processor, wherein the solver process changes the size of at least one of the geometric primitives, the change in the size of the at least one geometric primitive represents resizing of the respective rigid body;
the set of geometric primitives representing the respective rigid body allow the change in the size without user intervention; and
execute a rigid body simulation, wherein the at least one resized geometric primitive is input to the rigid body simulation.

16. The computer-readable data storage medium of claim 15, further comprising instructions causing a computer to use an output of the executed rigid body simulation as input to a second iteration of executing the solver process.

17. The computer-readable data storage medium of claim 15, wherein the instructions causing a computer to constrain one or more members of the set of geometric primitives comprises adding constraints that accomplish at least one of: constraining a subset of the members to be parallel to one another, constraining a subset of the members to be perpendicular to one another, and maintaining a prescribed angle between certain of the members.

18. The computer-readable data storage medium of claim 15, wherein each member in the set of geometric primitives is one of a point, a line, a plane, a circle, a planar polygon, a cylinder, a three-dimensional prism, and a parameterizable surface.

19. The computer-readable data storage medium of claim 15, wherein the set of geometric primitives comprises at least one of a line having endpoints that may change location, a rectangle having adjacent sides constrained by perpendicular constraints, a triangle having sides constrained by specified angles, a plane, a set of six planes, two perpendicular lines representing a cylinder, and a parameterizable surface.

20. The computer-readable data storage medium of claim 15, further comprising instructions causing a computer to select parameter values for the at least one resized geometric primitives output by the solver process, wherein:
the parameter values reflect a desired design of the model, and
the parameter values are design constraints.

* * * * *

UNITED STATES PATENT AND TRADEMARK OFFICE
CERTIFICATE OF CORRECTION

PATENT NO. : 10,068,036 B2  
APPLICATION NO. : 14/977902  
DATED : September 4, 2018  
INVENTOR(S) : Kyeong Hwi Lee and Shrikant Vitthal Savant Page 1 of 1

It is certified that error appears in the above-identified patent and that said Letters Patent is hereby corrected as shown below:

In the Claims

In Claim 10, Column 9, Line 46, delete "claim 9," and insert -- claim 8, --.

In Claim 12, Column 9, Line 53, delete "claim 9," and insert -- claim 8, --.

In Claim 13, Column 9, Line 61, delete "claim 9," and insert -- claim 8, --.

In Claim 14, Column 9, Line 66, delete "claim 9," and insert -- claim 8, --.

Signed and Sealed this  
Sixth Day of November, 2018

Andrei Iancu  
*Director of the United States Patent and Trademark Office*